Dec. 18, 1923.   1,478,323
M. DEAN
ANTISKID CHAIN SECURING DEVICE
Filed March 8, 1923.   2 Sheets-Sheet 1
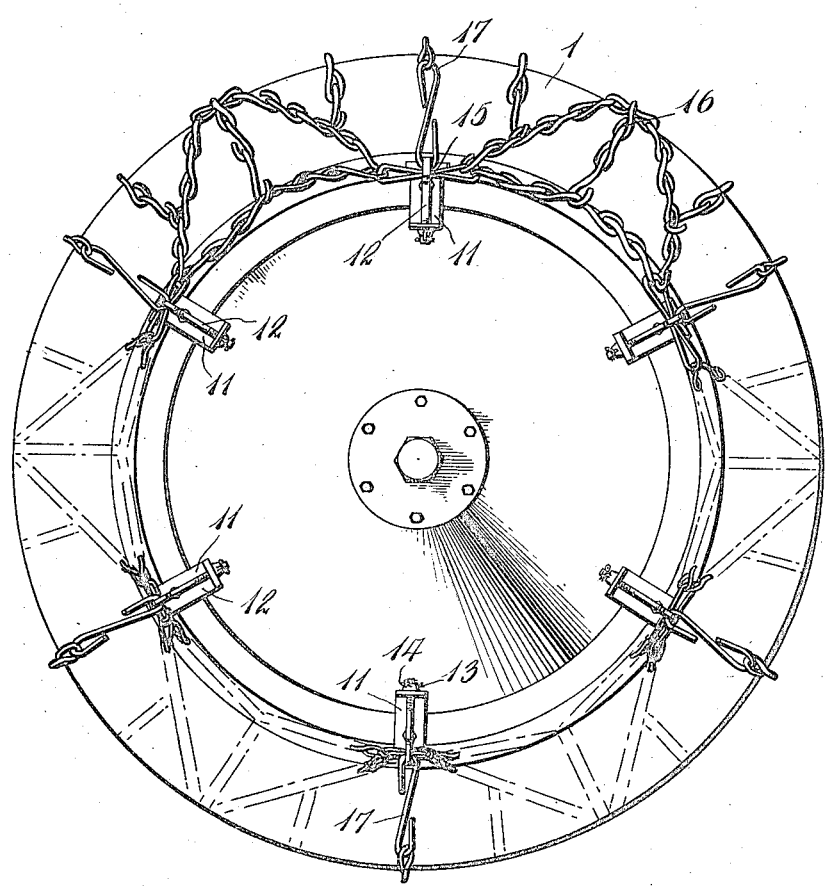
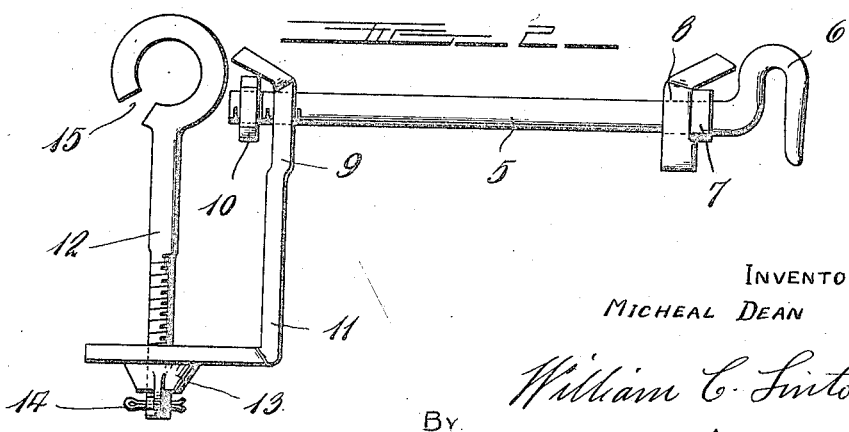
INVENTOR
MICHEAL DEAN
By William C. Linton
ATTORNEY

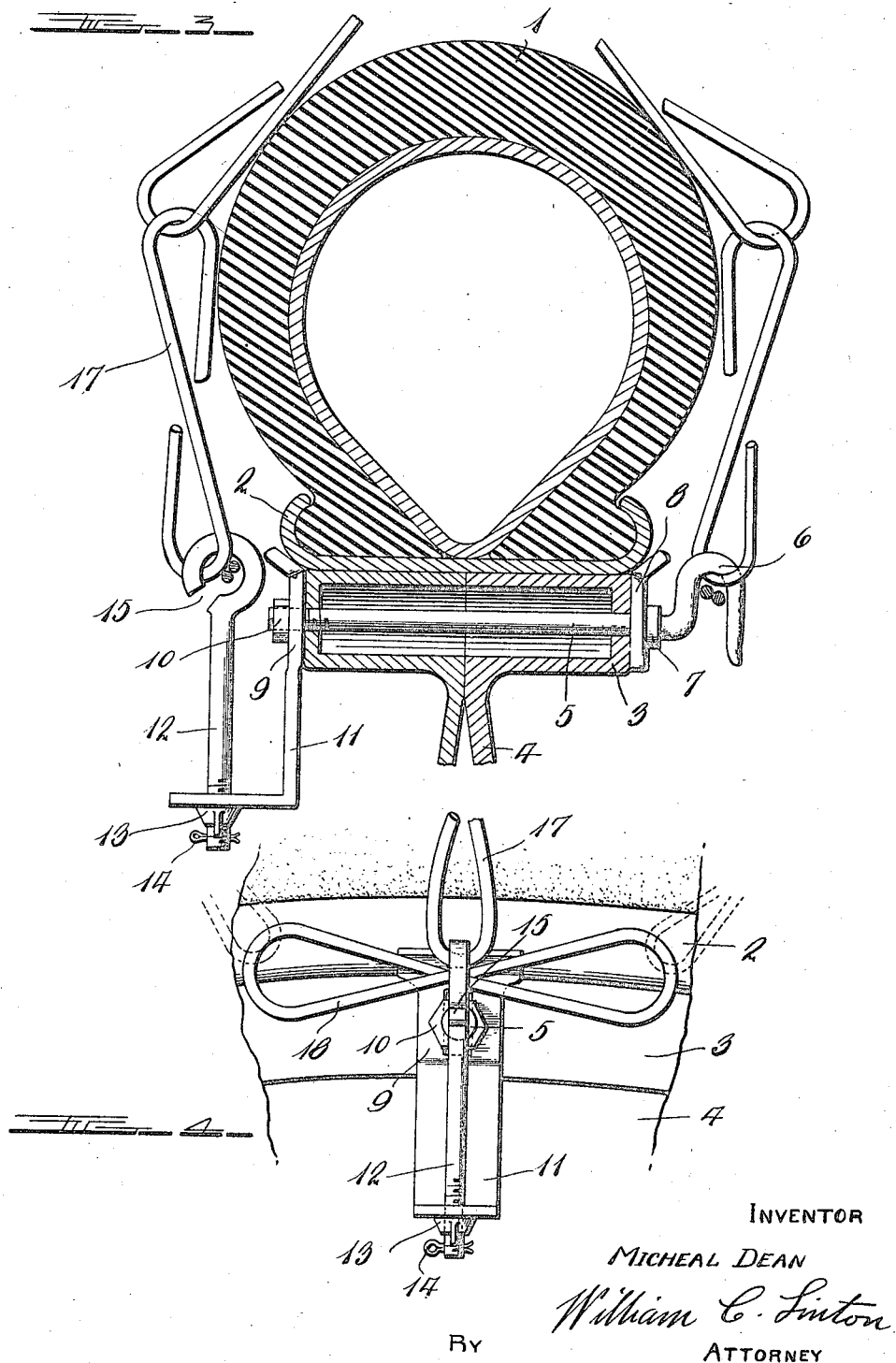

Patented Dec. 18, 1923.

1,478,323

UNITED STATES PATENT OFFICE.

MICHAEL DEAN, OF WEBSTER, PENNSYLVANIA.

ANTISKID-CHAIN-SECURING DEVICE.

Application filed March 8, 1923. Serial No. 623,801.

*To all whom it may concern:*

Be it known that I, MICHAEL DEAN, a citizen of the United States of America, residing at Webster, in the county of Westmoreland and State of Pennsylvania, have invented certain new and useful Improvements in Antiskid-Chain-Securing Devices; and I do hereby declare that the following is a full, clear, concise, and exact description of the invention, such as will enable others skilled in the art to which it appertains to make and use the same.

This invention relates to improvements in securing devices for vehicle wheels or tire anti-skid chains, having for an object to provide a chain securing device of such construction and arrangement as will permit of a dual use, first, as a locking means for holding the demountable rim securing lugs in proper position whereby to prevent displacement of the rim and second, as an effectual securing means for anti-skid chains, when it becomes necessary to employ the same.

It is likewise an object of the invention to provide an anti-skid chain securing device including means for varying the extent of engagement or tension of the chains about the vehicle wheel tire or tread in order that the same may be properly retained in position.

Other objects will be in part obvious and in part pointed out hereinafter.

In order that the invention and its mode of operation may be readily understood by persons skilled in the art, I have in the accompanying illustrative drawings, and in the detailed following description based thereon, set out one possible embodiment of the same.

In these drawings:—

Figure 1 is a side elevation of a vehicle wheel equipped with the invention;

Figure 2 is an enlarged detail in side elevation showing one of the anti-skid chain securing devices;

Figure 3 is an enlarged fragmentary vertical transverse section through the tire and felly portion of a wheel equipped with the anti-skid chain securing device; and, Figure 4 is a fragmentary detail in elevation showing the manner in which certain of the links of the anti-skid chains are engaged with the adjustable anchoring means of the device.

Having more particular reference to the drawings, in connection with which like characters of reference will designate corresponding parts throughout, the invention is particularly designed for use in securing those forms of vehicle anti-skid chains shown and described in my United States Patent Number 1,469,312, dated October 2, 1923, although, of course, it is to be understood that the invention may be as readily and effectually used for securing various other forms or types of vehicle chains, such as conditions or preference may dictate. In the present embodiment, as above referred to, I have shown the invention used in conjunction with that type of anti-skid chain described and claimed in my United States patent above set out and in this particular embodiment, the numeral 1 indicates the pneumatic tire of the vehicle wheel which tire is engaged in the usual demountable rim 2 arranged upon or about the felly 3 of the vehicle wheel 4.

It is usual, as will be understood, to secure the demountable rim 2 of the vehicle wheel in position upon the wheel felly and against displacement through the medium of fastening lugs which are retained in position by means of bolts adapted to receive the same thereover and with this in view, I provide transversely aligned openings in the wheel felly 3 adapted to receive therethrough bolts indicated by the numeral 5, certain of the ends of said bolts having inwardly disposed hooks 6 thereon and annular shoulders 7 formed adjacent the inner ends of said hooked portions as clearly shown in the Figures 2 and 3. These bolts 5 are adapted to be engaged with demountable rim securing lugs 8 and 9 positioned adjacent the opposite sides of the wheel felly and having outwardly extended portions adapted to engage the opposite sides of the demountable rim 2 whereby to prevent its lateral displacement. Locking nuts 10, of course, are turned into engagement with the screw threaded extremities of the various bolts 5 and serve as means for retaining the lugs 8 and 9 in their respective clamping positions with relation to the demountable rim 2.

Those fastening lugs indicated by the numeral 9 are provided with substantially right angularly formed extensions 11, the inner or free portions of which are provided with openings adapted to receive the screw threaded shanks of elongated eye-bolts or anchoring means 12 therethrough, whereupon wing nuts 13 or other suitable fastening devices are turned into engagement with the screw threaded extremities of said bolts, as clearly shown in the Figures 2 and 3 and are secured against undue displacement through the means of cotter pins, 14 passing through transverse openings in the end portions of such bolts. In this connection, it is to be noted that the eyes of the various bolts or anchoring means 12 are slit or provided with ways 15, which ways serve as means for facilitating the engagement of certain of the links of the anti-skid chain to be secured therein.

The anti-skid chains secured by the improved device may be stated to include a plurality of transversely and diagonally disposed circumferentially arranged chains generally indicated by the numeral 16. The free ends of certain of these chains are adapted to be engaged in the various inwardly disposed hooks 6 of the bolts 5 adjacent one side of the vehicle wheel felly, while the free links upon the opposite side of the wheel felly are adapted to be engaged in the eyes of the various bolts 12 by way of the openings 15 formed therein. These free links of the anti-skid chain are of substantially S-shaped formation as indicated in the Figure 3 by the numeral 17 and, as shown, are adapted to have the free or inner loop portions thereof engaged with the adjacent hooks 6 and eyes of the eye-bolts 12. These links 17 serve to secure in proper position over the vehicle tire tread, certain of the transverse anti-skid chains thereof, while to secure the opposite ends of certain of the diagonally disposed anti-skid chains, a looped link 18 is connected to such opposite end and is adapted to have the intermediate portion thereof engaged with the inwardly disposed hooks 6 and the eyes of the eye-bolts 12 in the manner shown in the Figures 1, 3 and 4.

In connecting the anti-skid chains to the securing device, it of course will be understood that the free links of certain of the ends thereof are first engaged with the inwardly disposed hooks 6, whereupon the links upon the opposite side of the vehicle wheel tire 1 are engaged in the eyes of the eye-bolts 12, whereupon the locking nuts 13 are adjusted upon the screw threaded shanks of said bolts to place the same as well as those chains engaged thereby under a tension sufficient to ensure of their proper positioning about the vehicle tire and over the tread. When proper adjustment or tensioning of the vehicle anti-skid chain has been attained, the locking nuts 13 are then secured against reverse rotation by passing cotter pins 14 through the transverse openings in the screw threaded portions of the various eye-bolts 12.

From the foregoing, it will be seen that I have provided a simple but very effectual form of anti-skid chain securing device, which, in addition to securing the anti-skid chains upon proper positions over a vehicle tire, will likewise serve as means for positively securing the demountable rim holding lugs in positions clampingly engaging their opposite sides whereby to prevent lateral displacement of such demountable rim.

Manifestly, the construction shown is capable of considerable modification and such modification as is within the scope of my claims, I consider within the spirit of my invention.

I claim:

1. In combination with a vehicle wheel and the demountable rim thereof, transverse bolts engageable in openings in the wheel felly, lugs engaged by said bolts upon the opposite sides of the demountable rim, certain of the ends of said bolts having hooks formed thereon and annular shoulders adjacent the inner ends of said hooks, brackets secured to the opposite ends of the bolts and adjustable chain anchoring means mounted on the brackets engageable with the adjacent ends of anti-skid chains.

2. In combination with a vehicle wheel and the demountable rim thereof, transverse bolts engageable in openings in the wheel felly, lugs clampingly secured in positions upon the opposite sides of the demountable rim by said bolts, certain of said lugs having bracket-like extensions thereon, certain of the ends of said bolts having hooks thereon and annular shoulders adjacent the inner ends of said hooks, and adjustable chain anchoring means mounted on the brackets.

3. In combination with a vehicle wheel and anti-skid chains, means engageable with the wheel for securing said chains in position over the tire thereof comprising transversely disposed bolts engageable in openings in the wheel felly, lugs received upon said bolts and clampingly engaged with the opposite sides of the demountable rim of the wheel, certain of said lugs having bracket-like extensions thereon, certain of the ends of said bolts having inwardly disposed hooks and annular shoulders formed thereon, and eye-bolts adjustably engaged in the free extremities of said bracket-like extensions adapted to receive certain of the links of said anti-skid chains therein, the links upon the opposite ends of said anti-skid chains being engaged in the inwardly disposed hooks.

4. In combination with a vehicle wheel and anti-skid chains thereof, transversely disposed bolts engageable in openings formed in the wheel felly, lugs received upon said bolts and clampingly engaged thereby upon the opposite sides of the demountable rim, certain of said lugs having substantially right angularly shaped extensions formed thereon provided with openings in their free portions, certain of the ends of said bolts having inwardly disposed hooks thereon, said hooks being adapted to be engaged in certain of the ends of the anti-skid chains, and eye-bolts adjustably engaged through the openings in the free portions of said right angular extensions of the lugs adapted to receive the free links upon the opposite ends of the anti-skid chains therein.

In witness whereof I have hereunto set my hand.

MICHAEL DEAN.